UNITED STATES PATENT OFFICE 2,008,739

ISODIBENZANTHRONE-SELENAZOLE AND PROCESS OF PREPARING THE SAME

Alexander J. Wuertz, Carrollville, and Myron S. Whelen, Milwaukee, Wis., assignors to E. I. du Pont de Nemours & Company, Wilmington, Del., a corporation of Delaware No Drawing. Original application April 29, 1933, Serial No. 668,623. Divided and this application April 29, 1933, Serial No. 668,624

16 Claims. (Cl. 260—44)

This application is a division of our copending application Ser. No. 668,623, filed of even date herewith.

This invention relates to selenium compounds of the isodibenzanthrone series. It is an object of this invention to prepare novel compounds of the isodibenzanthrone series which are useful as vat dyestuffs. Other and further important objects of this invention will appear as the description proceeds.

The compounds with which this invention deals are characterized by possessing in their structure an isodibenzanthrone nucleus which is substituted by both selenium and nitrogen. The latter two elements are very probably present in the form of a selenazole ring. With due allowance for partial decomposition of the selenazole ring during the fusion process by which our novel compounds are formed, they probably constitute mixtures of isodibenzanthrone-diselenazoles and isodibenzanthrone-monoselenazoles.

The products of this invention are navy blue to dark blue vat dyestuffs, depending on the particular substituent in the carbon atom of the selenazole ring, as well as on the presence or absence of substituents, such as halogen, in the isodibenzanthrone nucleus. They are prepared by caustic fusion of the Bz1-halogen-benzanthrone-selenazoles described and claimed in our copending application of even date, Ser. No. 668,621, wherein the Bz1-halogen-benzanthrone-selenazoles are prepared by reducing an anthraquinone 1-2-selenazole in sulfuric acid and either simultaneously or subsequently condensing it with glycerine. The benzanthrone-selenazole so produced may have the structure corresponding to one of the following formulæ:

The benzanthrone-selenazole product is then halogenated by suspending it in water and treating the suspension with a halogenating agent.

The caustic fusion may be carried out along analogous lines with the known procedures for fusing Bz1-halogen-benzanthrones to isodibenzanthrones. See, for instance, U. S. Patent No. 906,367. The preferred method involves the use of alcohol as a diluent and employs a temperature between 100 and 170° C. It is advantageous, however, to adhere to the lower temperatures, say 120 to 140° C., in order to minimize decomposition of the selenazole ring.

Isodibenzanthrones substituted in the nucleus may be obtained by fusing correspondingly substituted Bz1-halogen-benzanthrone-selenazoles, or the unsubstituted isodibenzanthrone-selenazoles may be formed first and then subjected to an operation for introducing substituents, as will be readily understood by those skilled in the art.

Without limiting our invention to any particular procedure, the following examples are given to illustrate our specific mode of operation. The parts mentioned are by weight.

*Example 1.—Fusion of Bz1-brom-benzanthrone-1,2-phenyl-selenazole*

3.3 parts of sodium are dissolved in 20 parts of alcohol, and thereto are added 20 parts of potassium hydroxide. The melt is heated to 120° C. and maintained at this temperature until completely fluid. 10 parts of Bz1-brom-benzanthrone-1,2-phenyl-selenazole (Example 6 of copending application, Ser. No. 668,621) are then added and the reaction mass is heated at about 135° C. for 2 hours. The fusion mass is then di-

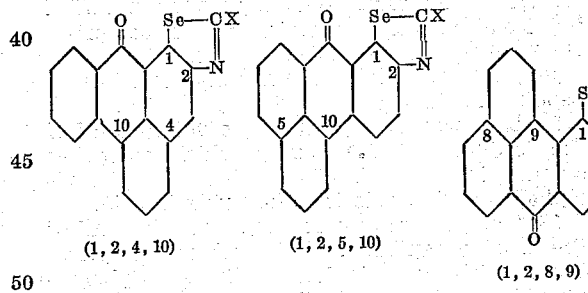

(1, 2, 4, 10)   (1, 2, 5, 10)   (1, 2, 8, 9)

It is uncertain, however, which one of the three is the correct formula, or whether indeed the product is not a mixture of the three or any two of them.

luted with about 1000 parts of warm water, thoroughly mixed, and the precipitated dyestuff is filtered off as an insoluble leuco body. It is washed free of impurities with a dilute solution of sodium hydroxide and sodium hydrosulfite in water, acidified, washed acid free with water and dried. The isoviolanthrone-selenazole body so formed is a violet-black powder, which on dissolving in sulfuric acid gives a green coloration. It dyes cotton from a blue vat with dark brown fluorescence, in navy blue shades. Its fastness to water is superior to that of isodibenzanthrone.

*Example 2.—Fusion of Bz1-chlor-benzanthrone-1,2-phenyl-selenazole*

7 parts of sodium are dissolved in 50 parts of alcohol, and thereto are added 50 parts of potassium hydroxide. The melt is heated to 125° C. and maintained at this temperature until completely fluid. 10 parts of Bz1-chlor-benzanthrone-1,2-phenyl-selenazole (Example 7 of copending application, Ser. No. 668,621), are then added and the reaction mass is heated at about 135° C. for one hour. The isodibenzanthrone-selenazole body so formed is isolated as in Example 1, and appears to be identical with the product therein obtained.

*Example 3.—Chlorination of selenazole substituted isodibenzanthrone*

10 parts of phenyl-selenazole-isodibenzanthrone (as obtained according to Example 1 above) are suspended in 100 parts of ortho-dichloro-benzene, and chlorine gas is slowly passed into the mixture until a chlorine content of about two atoms of chlorine has been reached. The halogenated dyestuff is then filtered off, and washed successively with ortho-dichloro-benzene and alcohol. It is a navy blue powder, which dyes cotton from a greenish-blue vat in navy blue shades. Dyeings so made are of superior fastness to water than those of dichloro-isodibenzanthrone.

*Example 4.—Bromination of phenyl-selenazole-isodibenzanthrone*

10 parts of phenyl-selenazole-isodibenzanthrone (prepared according to Example 1 above) are dissolved in 100 parts of chlorosulfonic acid. A trace of iodine is added, and then 5 parts of liquid bromine are introduced over a short period of time. The whole is then stirred until evolution of hydrobromic acid has practically ceased. The dyestuff is isolated by pouring the chlorosulfonic acid solution onto ice, followed by filtration and washing. The product so obtained is a violet powder which dyes cotton from a greenish-blue vat in navy blue shades of good fastness to water spotting. It corresponds in bromine content to a dibromo compound.

*Example 5.—Chlorination of phenyl-selenazole-isodibenzanthrone*

10 parts of phenyl-selenazole-isodibenzanthrone are dissolved in 100 parts of chlorosulfonic acid. A trace of iodine is added, and chlorine gas is then passed in slowly until the evolution of hydrochloric acid has practically ceased. The chlorinated body thus formed is isolated in a manner analogous to that shown in Examples 3 and 4. It dyes cotton from a greenish-blue vat in navy blue shades, which are reasonably fast against water spotting. Its chlorine content corresponds to a dichloro compound.

It will be understood that many variations and modifications are possible in our preferred mode of operation without departing from the spirit of this invention.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. A selenium containing vat dyestuff of the isodibenzanthrone series, yielding upon cotton navy blue to dark blue dyeings of superior waterfastness than those of isodibenzanthrone, said dyestuff being obtainable by subjecting to alkali fusion a Bz1-halogen-benzanthrone-1,2-selenazole in which the beta position in the anthraquinone nucleus adjacent the Bz-ring is unsubstituted.

2. A vat dyestuff comprising chiefly an isodibenzanthrone-alpha,beta-selenazole.

3. A vat dyestuff comprised chiefly of isodibenzanthrone-C-C'-diphenyl-alpha,beta-alpha',beta'-diselenazole.

4. The process of producing a vat dyestuff of the isodibenzanthrone series which comprises subjecting to alkali fusion a Bz1-halogen-benzanthrone-alpha,beta-selenazole in which the beta position in the anthraquinone nucleus adjacent the Bz-ring is unsubstituted.

5. The process of producing a vat dyestuff of the isodibenzanthrone series which comprises subjecting to alkali fusion a Bz1-halogen-benzanthrone-C-phenyl-alpha,beta-selenazole in which the beta position in the anthraquinone nucleus adjacent the Bz-ring is unsubstituted.

6. The process of producing a vat dyestuff of the isodibenzanthrone series which comprises fusing a Bz1-halogen-benzanthrone-1,2-selenazole in which the beta position in the anthraquinone nucleus adjacent the Bz-ring is unsubstituted with alcoholic caustic alkali at a temperature between 120 and 140° C.

7. The process of producing a vat dyestuff of the isodibenzanthrone series which comprises fusing Bz1-halogen-benzanthrone-1,2-C-phenyl-selenazole with alcoholic caustic alkali at a temperature between 120 and 140° C.

8. The process of producing a vat dyestuff of the isodibenzanthrone series which comprises fusing a Bz1-halogen-benzanthrone-1,2-selenazole in which the beta position in the anthraquinone nucleus adjacent the Bz-ring is unsubstituted with alcoholic caustic alkali at a temperature between 120 and 140° C., and subjecting the product to halogenation.

9. The process of producing a vat dyestuff of the isodibenzanthrone series which comprises fusing Bz1-halogen-benzanthrone-1,2-C-phenyl-selenazole with alcoholic caustic alkali at a temperature between 120 and 140° C., and subjecting the product to halogenation.

10. The process of producing a vat dyestuff of the isodibenzanthrone series, which comprises chlorinating an isodibenzanthrone-C-phenyl-alpha,beta-selenazole in an inert organic suspending medium.

11. The process of producing a vat dyestuff of the isodibenzanthrone series which comprises chlorinating an isodibenzanthrone-C-phenyl-alpha,beta-selenazole in chlorosulfonic acid.

12. The process of producing a vat dyestuff of the isodibenzanthrone series which comprises brominating an isodibenzanthrone-C-phenyl-alpha,beta-selenazole in chlorosulfonic acid.

13. The process of producing a vat dyestuff of the isodibenzanthrone series, which comprises halogenating an isodibenzanthrone-C-phenyl-alpha,beta-selenazole in an inert suspending medium and in the presence of a halogenation catalyst.

14. Halogenated isodibenzanthrone-C-phenyl-alpha,beta-selenazoles.

15. Dichlorinated isodibenzanthrone-C-phenyl-alpha,beta-selenazoles.

16. Dibrominated isodibenzanthrone-C-phenyl-alpha,beta-selenazoles.

ALEXANDER J. WUERTZ.
MYRON S. WHELEN.